(12) United States Patent
Boss et al.

(10) Patent No.: US 7,983,798 B2
(45) Date of Patent: Jul. 19, 2011

(54) FRAMEWORK FOR MANAGING CONSUMPTION OF ENERGY

(75) Inventors: Gregory J. Boss, American Fork, UT (US); James R. Doran, New Milford, CT (US); Rick A. Hamilton, II, Charlottesville, VA (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 12/208,422

(22) Filed: Sep. 11, 2008

(65) Prior Publication Data

US 2010/0063642 A1  Mar. 11, 2010

(51) Int. Cl.
    *G06F 19/00* (2011.01)
(52) U.S. Cl. ........................ 700/296; 455/572
(58) Field of Classification Search .................. 700/286, 700/291; 713/300; 307/29
    See application file for complete search history.

(56) References Cited

U.S. PATENT DOCUMENTS

| | | | |
|---|---|---|---|
| 5,404,136 A | 4/1995 | Marsden | |
| 5,572,438 A | 11/1996 | Ehlers et al. | |
| 5,706,191 A | 1/1998 | Bassett et al. | |
| 5,761,083 A | 6/1998 | Brown, Jr. et al. | |
| 5,958,012 A * | 9/1999 | Battat et al. | 709/224 |
| 6,178,362 B1 | 1/2001 | Woolard et al. | |
| 7,103,452 B2 | 9/2006 | Retsina | |
| 2002/0091972 A1* | 7/2002 | Harris et al. | 714/47 |
| 2005/0034023 A1* | 2/2005 | Maturana et al. | 714/37 |

OTHER PUBLICATIONS

Chen et al., A Relable Energy Information System for Promating Voluntary Energy Conservation Benefits, Jan. 2006, IEEE, p. 102-107.*
ENSITE, "EnSite Safari Suite," copyright 2008 EnSite Incorporated, www.capterra.com/energy-management-software/spotlight.

* cited by examiner

*Primary Examiner* — Kidest Bahta
(74) *Attorney, Agent, or Firm* — John R. Pivnichny; Ronald A. D'Alessandro; Keohane & D'Alessandro PLLC

(57) ABSTRACT

This invention discloses an intelligent framework for the overall management of energy allocated to components of a system. When conservation is desired or a shortage occurs, it is desirable to modulate energy to components, or to notify components and allow them to modulate themselves. It also discusses the establishment of a standard communications API between entities and components within the system. Among other things, this framework: manages device and entity enrollment into the system; provides an interface to heterogeneous devices; establishes standard communication methods between entities and components; dictates throttling to entities and components when conservation is required; and monitors energy throttling and compliance with modulate requests.

23 Claims, 4 Drawing Sheets

FRAMEWORK FOR MANAGING CONSUMPTION OF ENERGY

FIELD OF THE INVENTION

This invention discloses a framework for managing the consumption of energy. This framework typically yields energy conservation as a result of enabling fine grained policies for energy usage. It also provides a comprehensive management system for controlling energy usage within an enterprise during a shortage or for conservation purposes.

BACKGROUND OF THE INVENTION

As energy prices continue to rise, companies and individuals are seeking ways to reduce consumption and manage shortage situations. Currently, methods for managing energy shortage situations are limited, as managing energy usage of components in an infrastructure is a nascent industry. A few early solutions include: WebSphere XD, which allows application servers to be tuned down to lower energy consumption modes (WebSphere is a trademark of IBM Corp. in the United States and/or other countries); and devices may be connected to home appliances (e.g. air conditioner) that allow the energy company to turn off energy to the appliance when a shortage occurs. This only enables an on/off situation for selected devices.

Unfortunately, options for managing individual components of a system are limited, as most products do not provide intelligent options. Centralized management of heterogeneous devices during an energy shortage does not exist.

SUMMARY OF THE INVENTION

This invention discloses an intelligent framework for the overall management of energy allocated to components of a system. When conservation is desired or a shortage occurs, it is desirable to differentiate and modulate energy to components, or to alert/notify components and allow them to modulate themselves. It also discusses the establishment of a standard communications API between entities and components within the framework. Among other things, this framework: manages device and entity enrollment into the system; provides an interface to heterogeneous devices; establishes of standard communication methods between entities and components; dictates throttling to entities and components when conservation is required; and monitors energy throttling and compliance with modulate requests.

A first aspect of the invention provides a method for managing energy consumption, comprising: identifying a set of objects whose energy consumption will be managed; accessing a set of meta data for the set of objects, the set of meta data corresponding to communication and energy conservation properties; initiating an energy conservation request; communicating instructions pertaining to the energy conservation request to at least one of the set of objects; determining whether an acknowledgement is received from the at least one of the set of objects; and monitoring the at least one of the set of objects to ensure compliance with the instructions.

A second aspect of the invention provides a system for managing energy consumption, comprising: a module for identifying a set of objects whose energy consumption will be managed; a module for accessing a set of meta data for the set of objects, the set of meta data corresponding to communication and energy conservation properties; a module for initiating an energy conservation request; a module for communicating instructions pertaining to the energy conservation request to at least one of the set of objects; a module for determining whether an acknowledgement is received from the at least one of the set of objects; and a module for monitoring the at least one of the set of objects to ensure compliance with the instructions.

A third aspect of the invention provides a computer readable medium containing a program product for managing energy consumption, the computer readable medium comprising a set of program instructions for causing a computer system to: identify a set of objects whose energy consumption will be managed; access a set of meta data for the set of objects, the set of meta data corresponding to communication and energy conservation properties; initiate an energy conservation request; communicate instructions pertaining to the energy conservation request to at least one of the set of objects; determine whether an acknowledgement is received from the at least one of the set of objects; and monitor the at least one of the set of objects to ensure compliance with the instructions.

A fourth aspect of the invention provides a method for deploying a system for managing energy consumption, comprising: deploying a computer infrastructure being operable to: identify a set of objects whose energy consumption will be managed; access a set of meta data for the set of objects, the set of meta data corresponding to communication and energy conservation properties; initiate an energy conservation request; communicate instructions pertaining to the energy conservation request to at least one of the set of objects; determine whether an acknowledgement is received from the at least one of the set of objects; and monitor the at least one of the set of objects to ensure compliance with the instructions.

A fifth aspect of the invention provides at least one data processing system managing energy consumption, comprising: at least one memory medium having instructions; at least one bus coupled to the memory medium; and at least one processor coupled to the least one bus that when executing the instructions causes the at least one data processing system to: identify a set of objects whose energy consumption will be managed; access a set of meta data for the set of objects, the set of meta data corresponding to communication and energy conservation properties; initiate an energy conservation request; communicate instructions pertaining to the energy conservation request to at least one of the set of objects; determine whether an acknowledgement is received from the at least one of the set of objects; and monitor the at least one of the set of objects to ensure compliance with the instructions.

A sixth aspect of the invention provides a computer-implemented set of business goals and methods for managing energy consumption, comprising: identifying a set of objects whose energy consumption will be managed; accessing a set of meta data for the set of objects, the set of meta data corresponding to communication and energy conservation properties; initiating an energy conservation request; communicating instructions pertaining to the energy conservation request to at least one of the set of objects; determining whether an acknowledgement is received from the at least one of the set of objects; and monitoring the at least one of the set of objects to ensure compliance with the instructions.

BRIEF DESCRIPTION OF THE DRAWINGS

These and other features of this invention will be more readily understood from the following detailed description of the various aspects of the invention taken in conjunction with the accompanying drawings in which.

Figure 1:
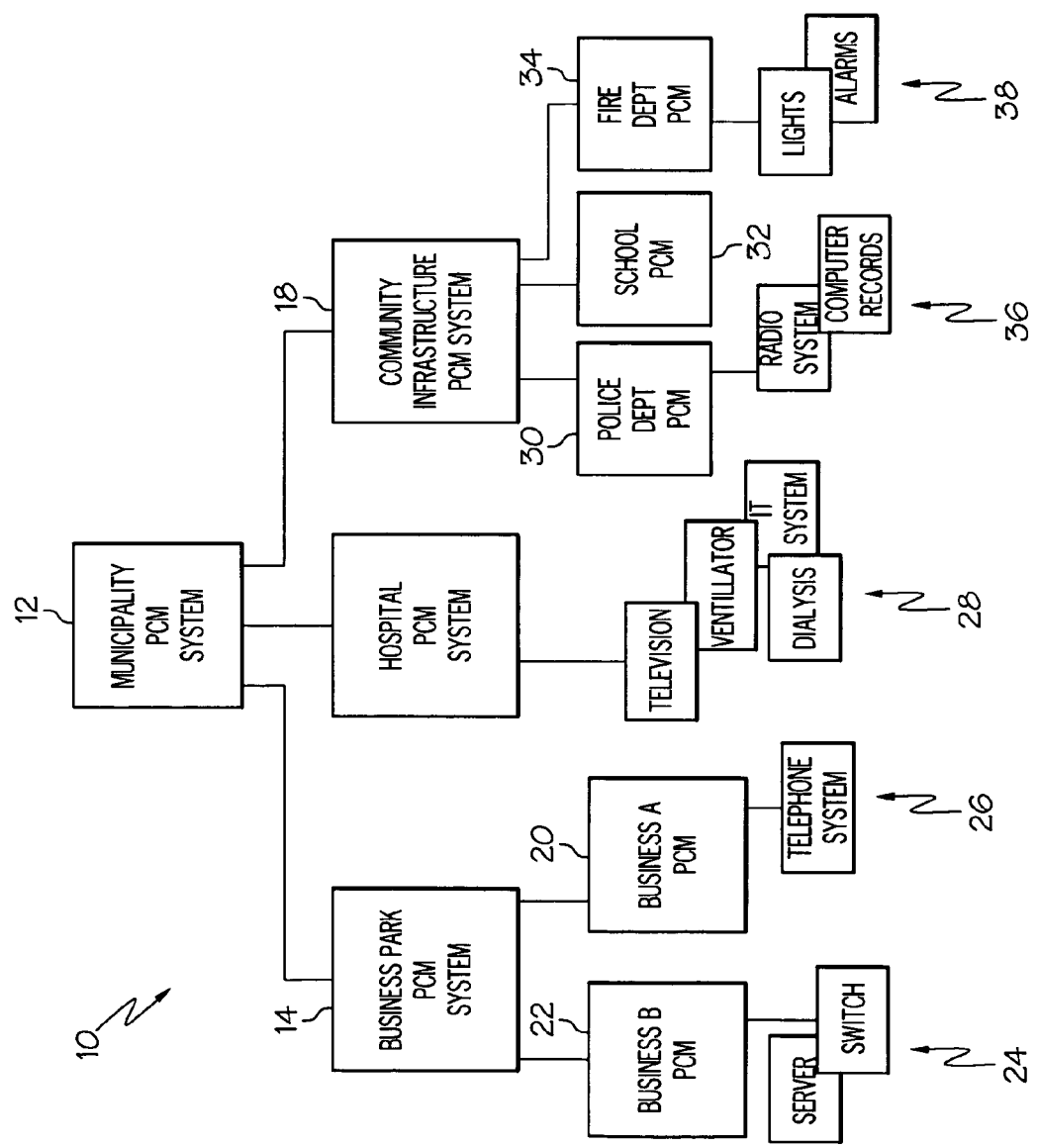
FIG. 1 depicts an illustrative framework hierarchy according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following Sections:

I. General Description
II. Computerized Implementation

I. General Description

As used herein, the following terms have the associated meanings:

"Set"—a quantity of at least one.
"Object"—any device, group of devices, or organization using devices that consume energy.

As indicated above, this invention discloses an intelligent framework for the overall management of energy allocated to components of a system. When conservation is desired or a shortage occurs, it is desirable to modulate energy to components, or to notify components and allow them to modulate themselves. It also discusses the establishment of a standard communications API between entities and components within the system. Among other things, this framework: manages device and entity enrollment into the system; provides an interface to heterogeneous devices; establishes standard communication methods between entities and components; dictates throttling to entities and components when conservation is required; and monitors energy throttling and compliance with modulate requests.

Referring now to FIG. 1 a framework hierarchy 10 is shown. FIG. 1 is to demonstrate, among other things, that the present invention could be implemented in conjunction with any hierarchy of devices, regardless of complexity. In the example shown, energy control management systems/energy control manager (hereinafter PCM) are utilized on multiple levels. Municipality PCM 12 works in conjunction with business park PCM 14, hospital PCM 16, and community infrastructure PCM 18. Further, business park PCM 14 interacts with business A PCM 20 and business B PCM 22, each of which controls energy consumption with their own devices 24 and 26. Similarly, hospital PCM 16 controls energy consumption by devices 28. Community infrastructure PCM 18 is shown interacting with police department PCM 30, school PCM 32, and fire department PCM 34, which among themselves, manage devices 36 and 38. As can be seen, a PCM under the present invention can not only interact with devices, but also with other PCMs.

Figure 2:
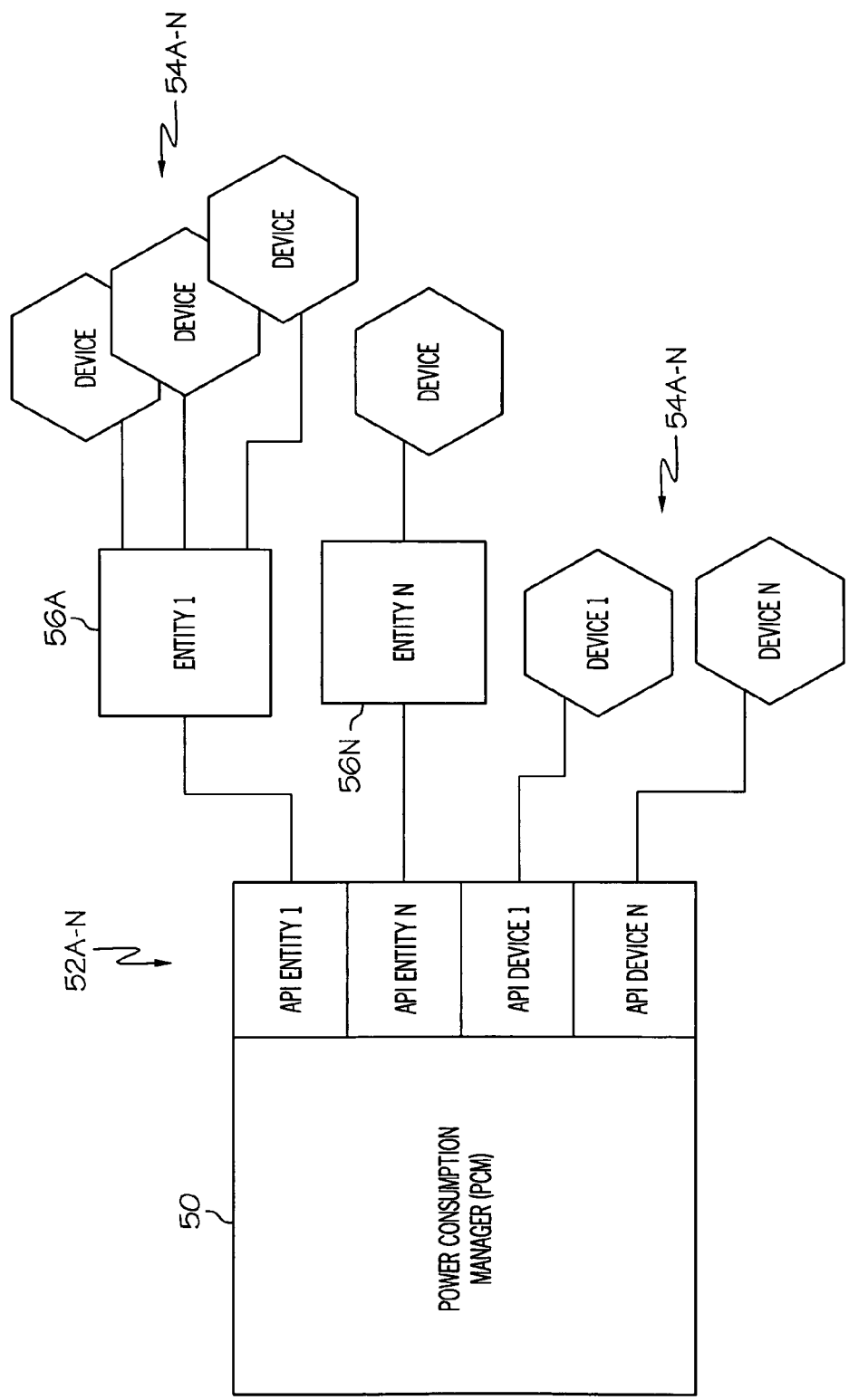
FIG. 2 depicts an interface to heterogeneous objects according to the present invention.

Referring now to FIG. 2, the functions of a PCM 50 will be described. As used in FIG. 2, entities 56A-B represent any business object that has one or more component/device. Sample entities may include a hospital, business or municipality. As such, devices 54A-N are each a piece of the overall system who's energy may be modulated. This may be a particular software application, piece of IT hardware (server, storage, networking switch, etc. . . . ), other hardware (life support equipment, refrigerator, etc.).

Under the present invention, each device, entity, etc. is enrolled into the system. This may occur manually, through auto-discovery by PCM 50 or by device 54A-N self-enrollment to PCM 50. Once enrolled, PCM 50 maintains a database of devices and their meta data. Sample device meta data are as follows:

Device ID=0487
Device name="refrigerator01"
Average energy consumed=50
Modulate capabilities="on/off"
Quiesce first="no"

Regardless, this functionality may be implemented with a single energy management server, groups of servers, or a hierarchy of servers. A hierarchy is the preferred embodiment for an enterprise system, as that allows for delegation to sub-entities.

As further depicted, PCM 50 has a set of application programming interfaces (APIs) 52A-N which allow communication to occur between PCM 50 and devices 54A-N and/or entities 56A-N. Although not shown in FIG. 2, an API would also allow PCM 50 to interface with another PCM. Heterogeneous devices from different vendors may have very different interfaces. The technology described herein will interface to different devices, or to any known or future energy management standard. For example, the interface to communicate with IBM WebSphere XD software (WebSphere is a trademark of IBM Corp in the United States and/or other countries) may differ greatly from the interface for a medical device to manage energy to an anesthesia machine, which would differ from the interface to a refrigerator.

Under the present invention, when energy conservation is needed (e.g., energy shortages are occurring, energy pricing is spiking, etc.), devices 54A-N may be modulated in any of following ways: On/Off, Stepwise (High, Med, Low settings), and Continuous. The awareness of the device throttling capabilities will be stored in either the device software or a PCM server. Commands sent to the device to instruct it to modulate will take into account these capabilities.

It is recognized that many devices may have proprietary interfaces for signaling to modulate energy. Although this framework provides for an API to interface to nonstandard devices, it is preferred that devices standardize their energy management interfaces in the future. This disclosure allows for the creation of standard methods and interfaces for communication to components of an intelligent energy management system. Heterogeneous hardware and software components may seamlessly plug into the framework for managing energy usage.

Figure 3:
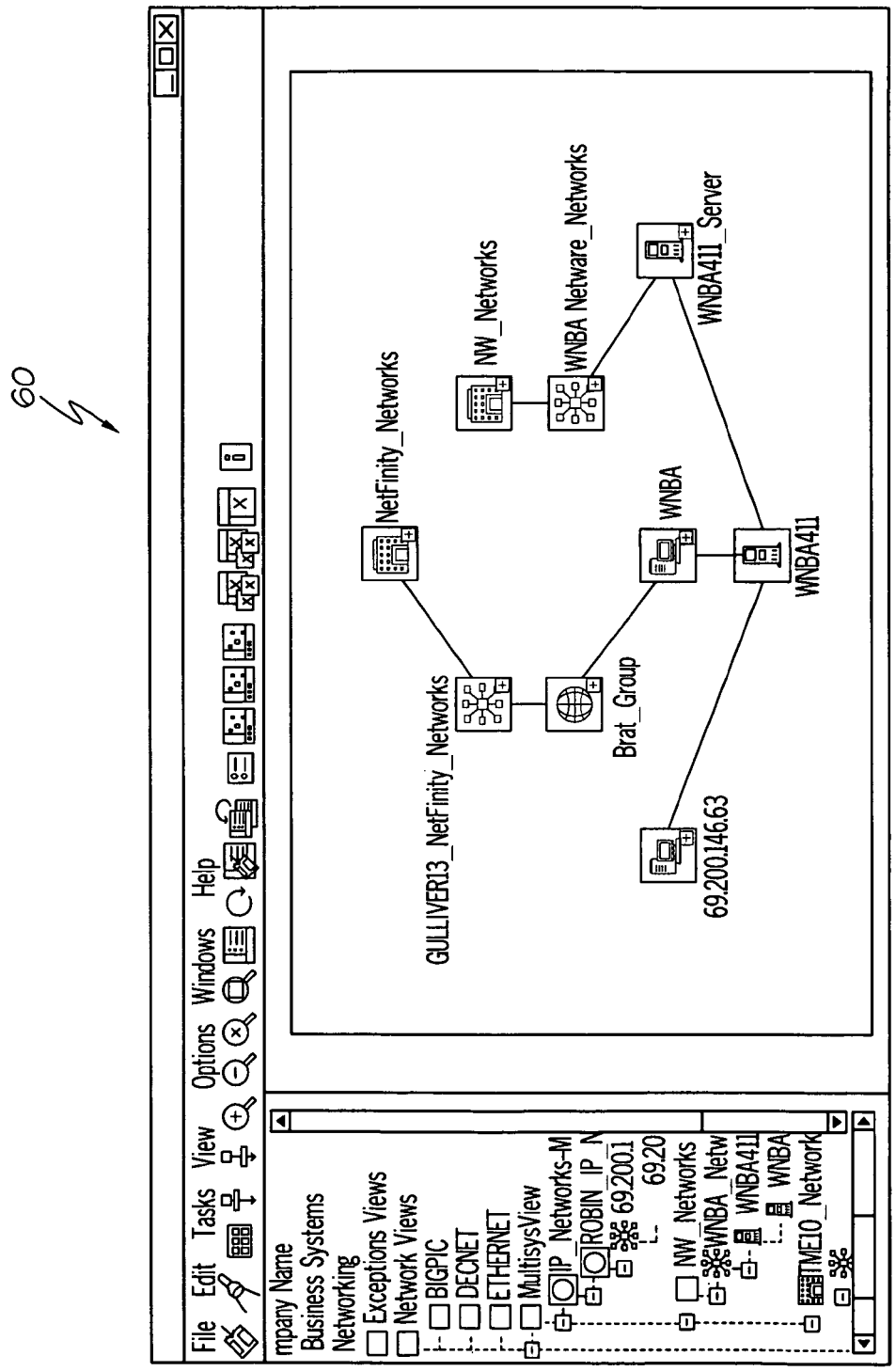
FIG. 3 depicts an illustrative graphical user interface (GUI) according to the present according to the present invention.

When conservation is required, PCM 50 notifies devices 54A-N. If time allows, this may allow them time to move to a quiescent state before throttling begins. Devices with the intelligence to lower their own usage may use this notification to modulate themselves. Other devices may require the management system to signal a separate energy management device to lower the energy to them. Along these lines, the energy reduction trigger may be automated by PCM 50 or initiated manually through PCM 50. The system may manage energy based on predictable cycles (e.g. lower energy overnight) or based on real-time request. Once energy reduction is needed, PCM 50 will communicate instructions to one or more devices 54A-N dictating just how energy should be consumed. Thereafter, PCM 50 will monitor such devices 54A-N to ensure compliance with the instructions. For optimal performance, the ability to communicate in real-time with entities 56A-N and devices 54A-N enables the system to monitor their energy consumption and compliance with throttling requests. In performing its functions, PCM 50 is typically controlled by one or more policies that state (among other things) when, how and for how long energy consumption should occur. To make control and programming of PCM 50 easier, the present invention can provide a graphical user interface (GUI) 50 similar to that shown in FIG. 3. Such a GUI 50 can provide all functionality discussed herein including compiling and changing hierarchies of devices and/or entities, managing policies, managing energy consumption triggers, issuing instructions to devices, monitoring devices, etc.

Illustrative Scenario

1. PCM identifies all devices and entities in the system, their meta data and throttling capabilities.
2. When energy conservation request is initiated (either shortage occurred or conservation is desired).
   a. PCM communicates quiesce command to devices that require it to stop traffic prior to initiating modulate.
   b. PCM communicates signaling to entities and devices to modulate.
3. PCM instructs device to modulate, including how much modulate is required and time duration.
4. Device confirms or denies.
5. PCM monitors entities and devices to ensure compliance with modulate requests.

II. Computerized Implementation

Figure 4:
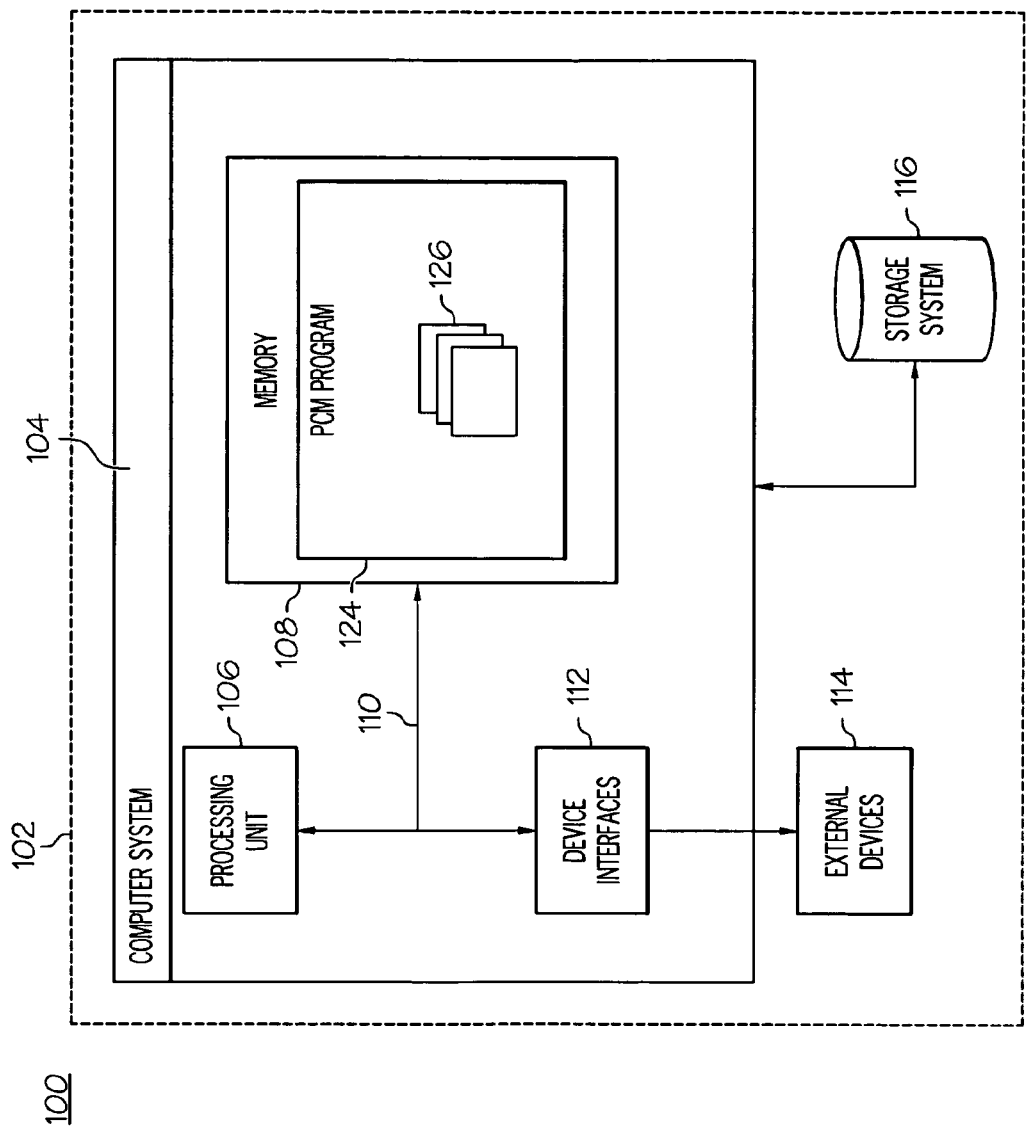
FIG. 4 depicts a more specific computerized implementation according to the present invention.

Referring now to FIG. 4, a computerized implementation 100 of the present invention is shown. As depicted, implementation 100 includes computer system/PCM 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to implement, deploy, and/or perform the functions of the present invention for others.

Computer system is intended to represent any type of computer system that may be implemented in deploying/realizing the teachings recited herein. In this particular example, computer system 104 represents an illustrative system that could represent a PCM. It should be understood that any other computers implemented under the present invention will have similar components, but may perform different functions/have different software. As shown, computer system 104 includes a processing unit 106, a memory 108, a bus 110, and device interfaces 112. Further, computer system 104 is shown communicating with one or more external devices 114 that communicate with bus via device interfaces. In general, processing unit 106 executes computer program code, such PCM program 124, which is stored in memory 108 and/or storage system 116. While executing computer program code, processing unit 106 can read and/or write data to/from memory 108, storage system 116, and/or device interfaces 112. Bus 110 provides a communication link between each of the components in computer system 104. Although not shown, computer system 104 could also include I/O interfaces that communicate with: one or more external devices such as a kiosk, a checkout station, a keyboard, a pointing device, a display, etc.); one or more devices that enable a user to interact with computer system 104; and/or any devices (e.g., network card, modem, etc.) that enable computer system 104 to communicate with one or more other computing devices. Although not shown, computer system 104 could contain multiple processing units.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various processes of the invention. Moreover, computer system 104 is only representative of various possible computer systems that can include numerous combinations of hardware. To this extent, in other embodiments, computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, device interfaces 112 can comprise any module for exchanging information with one or more external devices. Still further, it is understood that one or more additional components (e.g., system software, math co-processing unit, etc.) not shown in FIG. 2 can be included in computer system 104.

Storage system 116 can be any type of system (e.g., storage units 70A-N of FIG. 3) capable of providing storage for information under the present invention. To this extent, storage system 116 could include one or more storage devices such as magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into computer system 104.

Shown in memory 108 of computer system 104 is PCM program 124, which has a set of modules 126. Set of modules 126 generally provide the functions of the present invention as described herein. Specifically (among other things), set of modules 26 is configured to: identify a set of objects whose energy consumption will be managed; access a set of meta data for the set of objects, the set of meta data corresponding to communication and energy conservation properties; initiate an energy conservation request; communicate instructions pertaining to the energy conservation request to at least one of the set of objects; determine whether an acknowledgement is received from the at least one of the set of objects; monitor the at least one of the set of objects to ensure compliance with the instructions; enroll the set of objects with an energy control manager; auto-discover the set of objects within a system whose energy consumption is being managed by the energy control manager; communicate a quiesce command requiring the set of objects to stop energy consumption traffic; communicate signaling to the objects to modulate energy consumption; generate/communicate instructions indicating how much energy throttling is required and a time duration for the energy throttling.

While shown and described herein as a framework for managing consumption of energy, it is understood that the invention further provides various alternative embodiments. For example, in one embodiment, the invention provides a computer-readable/useable medium that includes computer program code to enable a computer infrastructure to enable management of energy consumption. To this extent, the computer-readable/useable medium contains program code that implements each of the various processes of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 4) and/or storage system 116 (FIG. 4) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to provide management of energy consumption. In this case, the service provider can create, maintain, support, etc., a computer infrastructure, such as computer infrastructure 102 (FIG. 4) that performs the process of the invention for one or more customers. In return, the service provider can receive payment from the customers under a subscription and/or fee agreement and/or the service provider can receive payment from the sale of advertising content to one or more third parties.

In still another embodiment, the invention provides a computer-implemented method for managing of energy consumption. In this case, a computer infrastructure, such as computer infrastructure 102 (FIG. 4), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system 104 (FIG. 4), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/ driver for a particular computing and/or device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for managing energy consumption, comprising:

identifying a set of objects whose energy consumption will be managed;

accessing a set of meta data for the set of objects, the set of meta data corresponding to communication and energy conservation properties, wherein the energy conservation properties include throttling capabilities for the set of objects;

initiating an energy conservation request;

communicating instructions pertaining to the energy conservation request to at least one of the set of objects, wherein, based on the throttling capabilities, the instructions comprise: a notification to the at least one of the set of objects to modulate its own energy usage in the case that the at least one of the set of objects is capable of lowering its own energy usage, and a signal to a separate energy management device to lower an amount of energy to the at least one of the set of objects in the case that the at least one of the set of objects is not configured to lower its own energy usage;

determining whether an acknowledgement is received from the at least one of the set of objects; and monitoring the at least one of the set of objects to ensure compliance with the instructions.

2. The method of claim 1, further comprising enrolling the set of objects with an energy control manager.

3. The method of claim 2, the enrolling comprising auto-discovering the set of objects within a system whose energy consumption is being managed by the energy control manager.

4. The method of claim 2, the enrolling comprising manually enrolling the set of devices.

5. The method of claim 2, further comprising an interface for enabling communications between the energy control manager and the set of objects.

6. The method of claim 1, further comprising:
communicating a quiesce command requiring the set of objects to stop energy consumption traffic; and
communicating signaling to the objects to modulate energy consumption.

7. The method of claim 1, the instructions indicating how much energy throttling is required and a time duration for the energy throttling.

8. The method of claim 1, the set of objects being selected from a group consisting of a device and an entity having at least one device.

9. A system for managing energy consumption, comprising:
a module for identifying a set of objects whose energy consumption will be managed;
a module for accessing a set of meta data for the set of objects, the set of meta data corresponding to communication and energy conservation properties, wherein the energy conservation properties include throttling capabilities for the set of objects;
a module for initiating an energy conservation request;
a module for communicating instructions pertaining to the energy conservation request to at least one of the set of objects, wherein, based on the throttling capabilities, the instructions comprise: a notification to the at least one of the set of objects to modulate its own energy usage in the case that the at least one of the set of objects is capable of lowering its own energy usage, and a signal to a separate energy management device to lower an amount of energy to the at least one of the set of objects in the case that the at least one of the set of objects is not configured to lower its own energy usage;
a module for determining whether an acknowledgement is received from the at least one of the set of objects; and
a module for monitoring the at least one of the set of objects to ensure compliance with the instructions.

10. The system of claim 9, the system comprising an energy control manager that further comprises a module for enrolling the set of objects.

11. The system of claim 10, the module for enrolling being configured to auto-discover the set of objects within a system whose energy consumption is being managed by the energy control manager.

12. The system of claim 10, the module for enrolling being configured to accept manual enrollment of the set of devices.

13. The system of claim 10, further comprising an interface for enabling communications between the energy control manager and the set of objects.

14. The system of claim 9, further comprising:
a module for communicating a quiesce command requiring the set of objects to stop energy consumption traffic; and
a module for communicating signaling to the objects to modulate energy consumption.

15. A computer readable medium containing a program product for managing energy consumption, the computer readable medium comprising a set of program instructions for causing a computer system to:
identify a set of objects whose energy consumption will be managed;
access a set of meta data for the set of objects, the set of meta data corresponding to communication and energy conservation properties, wherein the energy conservation properties include throttling capabilities for the set of objects;
initiate an energy conservation request;
communicate instructions pertaining to the energy conservation request to at least one of the set of objects, wherein, based on the throttling capabilities, the instructions comprise: a notification to the at least one of the set of objects to modulate its own energy usage in the case that the at least one of the set of objects is capable of lowering its own energy usage, and a signal to a separate energy management device to lower an amount of energy to the at least one of the set of objects in the case that the at least one of the set of objects is not configured to lower its own energy usage;
determine whether an acknowledgement is received from the at least one of the set of objects; and
monitor the at least one of the set of objects to ensure compliance with the instructions.

16. The computer readable medium containing the program product of claim 15, the computer readable medium further comprising a set of program instructions for causing the computer system to enroll the set of objects with an energy control manager.

17. The computer readable medium containing the program product of claim 16, the computer readable medium further comprising a set of program instructions for causing the computer system to auto-discover the set of objects within a system whose energy consumption is being managed by the energy control manager.

18. The computer readable medium containing the program product of claim 16, the computer readable medium further comprising a set of program instructions for causing the computer system to manually enroll the set of devices.

19. The computer readable medium containing the program product of claim 16, further comprising an interface for enabling communications between the energy control manager and the set of objects.

20. The computer readable medium containing the program product of claim 15, the computer readable medium further comprising a set of program instructions for causing the computer system to:
communicate a quiesce command requiring the set of objects to stop energy consumption traffic; and
communicate signaling to the objects to modulate energy consumption.

21. The computer readable medium containing the program product of claim 15, the instructions indicating how much energy throttling is required and a time duration for the energy throttling.

22. A method for deploying a system for managing energy consumption, comprising:
deploying a computer infrastructure being operable to:
identify a set of objects whose energy consumption will be managed;
access a set of meta data for the set of objects, the set of meta data corresponding to communication and energy conservation properties, wherein the energy conservation properties include throttling capabilities for the set of objects;
initiate an energy conservation request;
communicate instructions pertaining to the energy conservation request to at least one of the set of objects, wherein, based on the throttling capabilities, the instructions comprise: a notification to the at least one of the set of objects to modulate its own energy usage in the case that the at least one of the set of objects is capable of lowering its own energy usage, and a signal to a separate energy management device to lower an amount of energy to the at least one of the set of objects in the case that the at least one of the set of objects is not configured to lower its own energy usage;

determine whether an acknowledgement is received from the at least one of the set of objects; and
monitor the at least one of the set of objects to ensure compliance with the instructions.

23. The method of claim 1, the computer infrastructure comprising an energy control manager.

* * * * *